United States Patent Office 3,431,974
Patented Mar. 11, 1969

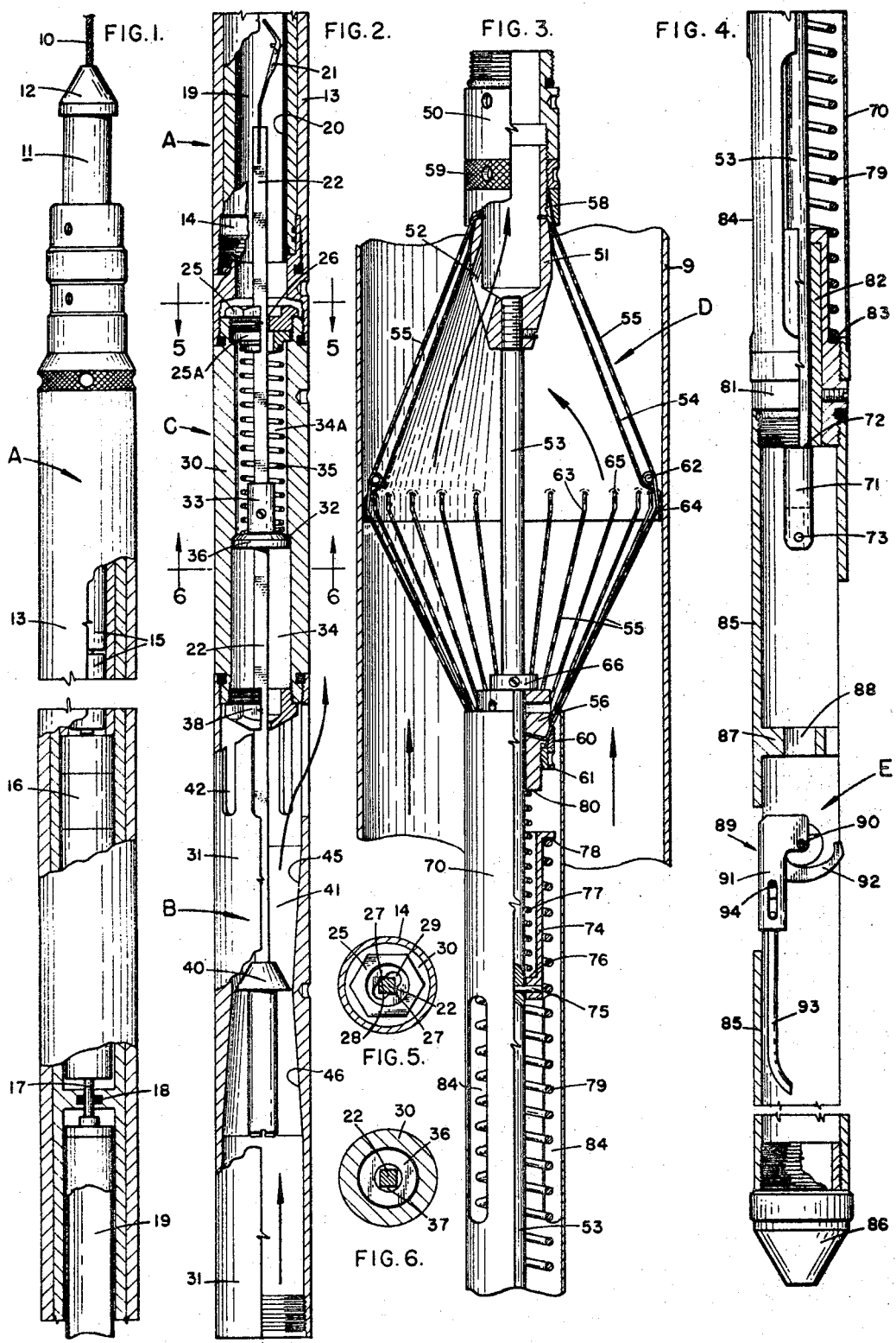

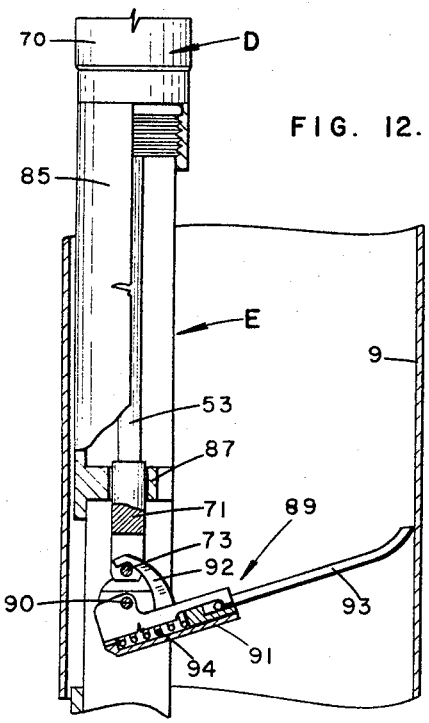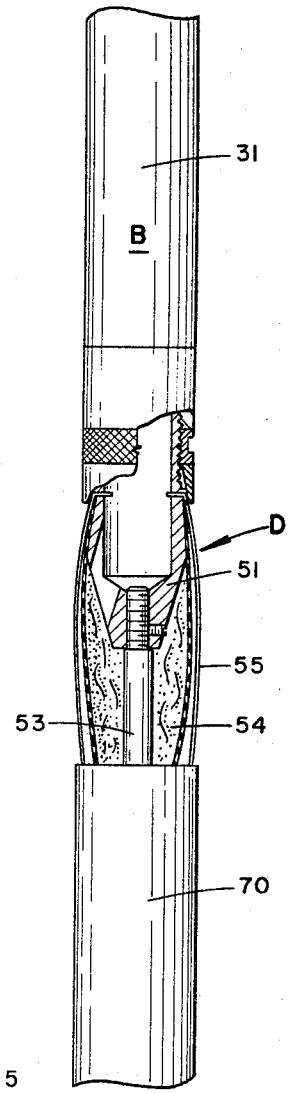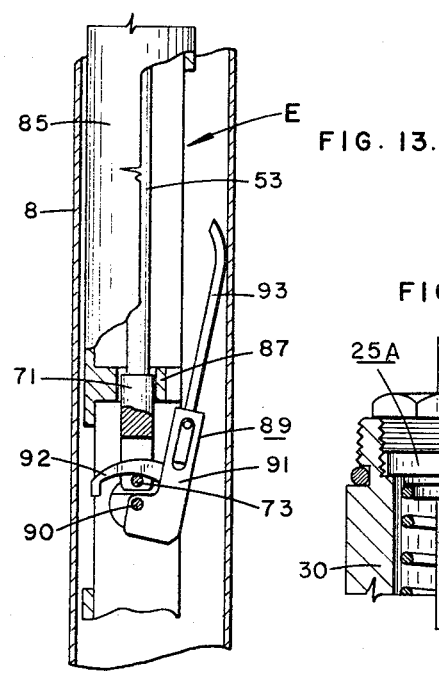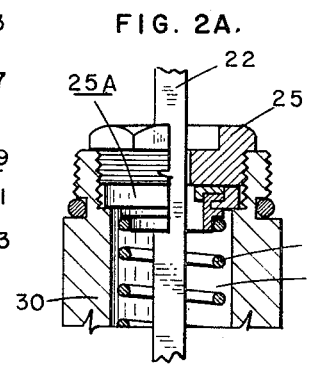

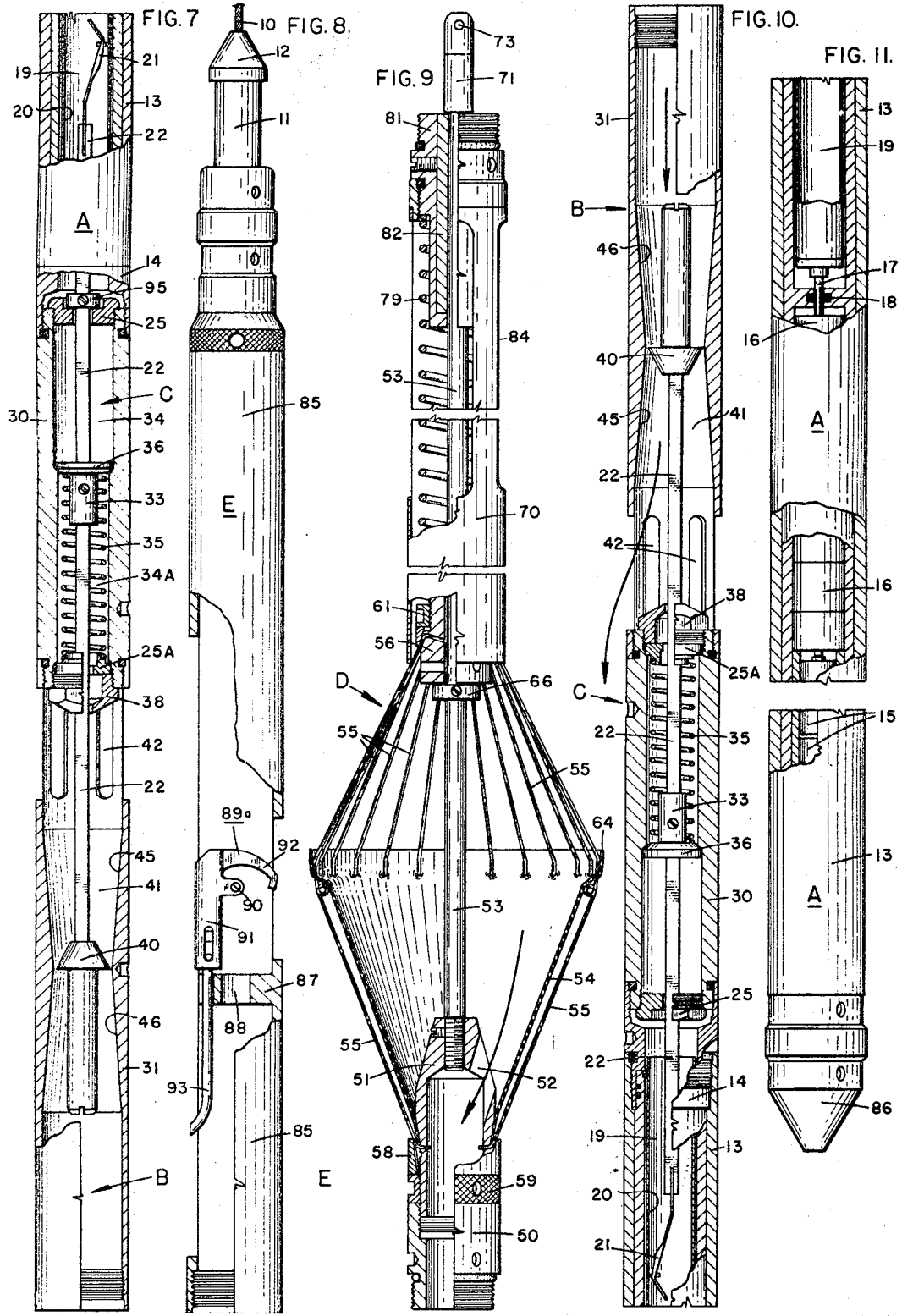

3,431,974
SUBSURFACE FLUID FLOW DIVERTER
Henry M. Buck, Judith F. Bruecher, and Louis A. Carlton, Houston, and Aaron E. Pierce, Humble, Tex., assignors to Esso Production Research Company, a corporation of Delaware
Filed Jan. 24, 1966, Ser. No. 522,720
U.S. Cl. 166—136                               8 Claims
Int. Cl. E21b 33/12, 23/00, 47/00

ABSTRACT OF THE DISCLOSURE

A collapsible-expansible umbrella-type flow diverter capable of being lowered through small diameter well pipe when collapsed and expanded in large diameter well pipe. The flow diverter is particularly useful with subsurface fluid flow measuring apparatus which requires diversion of fluid flow therethrough.

---

The present invention generally concerns improved flow diverter apparatus for use with subsurface flowmeters. In particular, it concerns a collapsible-expansible, umbrella-type flow diverter which is capable of being collapsed to permit it to be lowered through small diameter well pipe (tubing) and of being expanded in large diameter well pipe (casing) below the small diameter pipe to divert all of the fluid flowing in the large well pipe through the flowmeter.

Although the flow diverter can be used with any subsurface flow measuring apparatus which requires diversion of fluid flow therethrough, it is particularly suitable for use with the flowmeter apparatus disclosed and claimed in copending U.S. patent application Ser. No. 522,156, entitled, "Improved Subsurface Flowmeter," by L. A. Carlton and E. Rich. The flowmeter of that application is self-contained, subsurface recording and suspendible in the well on a nonconductor wireline. Operation of the flow diverter of the present invention is described herein in connection with the operation of that particular flowmeter.

An essential requirement for accurately measuring the rate of flow of fluid in a well is that all of the fluid flows through the flowmeter. It is not difficult to provide apparatus to divert all of the fluid to flow through a flowmeter when the well pipe through which the flowmeter is lowered into the well is the same size as the well pipe in which the flow measurements are to be made. However, where it is necessary to lower the flowmeter through small diameter well pipe for operation in large diameter well pipe below the small pipe, a suitable flow diverter must be collapsible or contractible to permit lowering it into the well through the smaller diameter well pipe and it must be expansible in the larger diameter well pipe in order to close off the annulus or space surrounding the flow diverter to insure that all of the fluid flowing in the larger diameter pipe is diverted through the flowmeter.

A primary objective of the present invention, therefore, is to provide an improved flow diverter adaptable for use with flow measuring apparatus and which is capable of being contracted to facilitate lowering it through small diameter well pipe and expanded for diverting all of the fluid flowing in large diameter well pipe below the small diameter pipe through the flow measuring apparatus.

Briefly, the apparatus of the invention adapted to divert fluid flowing in well pipe comprises a fixed mandrel; a rod member connected to said fixed mandrel; a slidable mandrel arranged on said rod member spaced from the fixed mandrel; a plurality of collapsible-expansible resilient spring wire ribs uniformly and circularly spaced about and extending axially of the rod member, each wire rib being connected at one end thereof to said fixed mandrel and at the other end thereof to said slidable mandrel; and an impermeable skirt sealingly connected at one end thereof to the fixed mandrel and extending within the wire ribs along a portion of the length thereof and then extending exterior of the wire ribs, said wire ribs being preformed to bow radially outwardly and the skirt being arranged in such a manner that the portion of the skirt which is exterior of the wire ribs would be caused to sealingly engage the wall of the well pipe in which such apparatus is operated. Means are provided on each wire rib adjacent the point where the skirt extends exterior of the ribs to hold the skirt in proper shape when the ribs are expanded. Means are also provided on said rod member adapted to urge the slidable mandrel toward the fixed mandrel to force the skirt against the well pipe wall in which the apparatus is operated with a larger force than that obtained from the spring of the wire ribs alone. The flow diverter apparatus is also provided with a releasable protective sleeve which covers the skirt and ribs and protects them when the flow diverter is being lowered to operating position. In addition, a mechanically operated sleeve release mechanism is provided to remove the protective sleeve from the skirt and ribs when the flow diverter is in its operating position.

The above object and other objects and advantages of the invention will be apparent from a more detailed description thereof when taken in conjunction with the drawings wherein:

FIGS. 1 to 4 are vertical, partly sectional views of flow measuring apparatus including the collapsible-expansible fluid flow diverter of the present invention in expanded position arranged for diverting fluid flowing upwardly in well pipe;

FIG. 2A is an enlarged detailed view of a portion of FIG. 2;

FIG. 5 is a view taken on lines 5—5 of FIG. 2;

FIG. 6 is a view taken on lines 6—6 of FIG. 2;

FIG. 7 is a vertical, partly sectional view of the portion of the flowmeter apparatus shown in FIG. 2 illustrating arrangement of the sections of the flowmeter for measuring and recording high rates of fluid flowing only upwardly in well pipe;

FIGS. 8 to 11 are vertical, partly sectional views of flow measuring apparatus including the collapsible-expansible fluid flow diverter of the present invention in expanded position arranged for diverting fluid flowing downwardly in casing pipe;

FIG. 12 is a vertical, partly sectional view of the releasable latch mechanism of FIG. 4 arranged in its latched position as it is lowered through casing;

FIG. 13 is a view similar to that of FIG. 12, but illustrating the position of the releasable latch mechanism as it is lowered through tubing; and FIG. 14 is a vertical, partly sectional view of the flow diverter of FIG. 3 in collapsed running-in position.

For a more complete description of the invention, reference to the drawings in greater detail will now be made.

One arrangement of the flowmeter for measuring and recording the rate and direction of well fluids flowing in well pipe is illustrated from top to bottom in FIGS. 1 and 2. The flowmeter is suspended from the earth's surface in the well on a nonconductor wireline 10 attached to a head member 11 provided with a fishing spear 12. A flow recording section A, a rotometer section B and an intermediate section C positioned between sections A and B are attached to head 11.

Flow recording section A includes an elongated, cylindrical case 13 threadedly connected to head 11 at its upper end and to a cylindrical sleeve member 14 at its lower end. Enclosed within case 13 are a plurality of batteries 15 connected to an electric chart drive motor 16; a chart drum drive shaft 17 provided with a seal 18; a chart drum 19; a chart 20 arranged on the inner surface of chart drum 19; a stylus 21; and the upper end of a square-shaped rotometer shaft 22 attached to stylus 21.

Intermediate section C comprises a hollow, cylindrical member 30 threadedly connected to the lower end of sleeve member 14 at its upper end and at its lower end to the upper end of double-tapered flow barrel or tube 31 of rotometer section B. A guide nut 25 provided with an opening 26 through which square shaft 22 extends is screwed into the upper end of cylindrical member 30. (See also FIG. 5.) Two grooved keyway bushings 27 are formed on opposite sides of opening 26. Diagonally opposed edges 28 of shaft 22 engage keyways 27 and prevent rotation of shaft 22. Spaces 29 are provided by opening 26 to permit debris that might collect above nut 25 to be flushed through it. The area of contact of keyways 27 with shaft 22 is maintained at a minimum to reduce drag on shaft 22.

The interior surface of cylindrical member 30 intermediate its length is provided with a beveled shoulder 32 which forms an opening within member 30 of larger and smaller diameters 34 and 34A, respectively. Shaft 22 extends through this opening in cylindrical member 30. A stop sleeve 33 is affixed to and movable with shaft 22. A tension spring 35 surrounds shaft 22 within cylindrical member 30 and is connected at its upper end to spring retainer members 25A supported in the upper end of member 30 beneath guide nut 25 (as shown in detail in FIG. 2A) and at its lower end to a cylindrical plate stop member 36 arranged in the larger diameter portion of cylinder 30. Spring 35 biases plate member 36 upwardly against beveled shoulder 32. Plate member 36 is provided with a circular opening 37 through which shaft 22 extends (see FIG. 6). A centralizer nut 38 provided with an opening through which shaft 22 extends is threadedly connected to the lower interior surface of cylinder 30.

Shaft 22 is connected to a rotometer float 40 arranged in the flow passageway 41 within flow barrel 31 of section B. Ports 42 are provided in flow barrel 31 at one end of flow passageway 41. As shown in FIG. 2, the upper interior surface 45 of flow barrel 31 tapers downwardly and inwardly and meets the lower interior surface 46 of barrel 31 which tapers inwardly and upwardly. Thus, the interior surface of flow barrel 31 defines two variable cross-sectional area (upper and lower) portions with the smallest cross-sectional area being located therebetween. Float 40 is positioned at the smallest cross-sectional area under no-flow conditions.

The lower end of flow barrel 31 is adapted to be threadedly connected to a coupling member 50 which in turn is threadedly connected to a fixed mandrel 51 of flow diverter section D, as seen in FIG. 3. Mandrel 51 is provided with ports 52 which permit passage of fluid flowing to and from passageway 41. A rod 53 is connected to mandrel 51 and extends through the interior of flow diverter section D.

The upper ends of a plurality of spring wire ribs 55, spaced circularly and uniformly about rod 53, are connected to fixed mandrel 51 with the lower ends thereof connected to a sliding mandrel 56 which is threaded about its lower exterior. An upper cylindrical wedge member 58, locked in place by means of a nut 59 threaded to the upper end of fixed mandrel 51, secures the upper ends of wire ribs 55. A lower cylindrical wedge member 60, locked in place by means of a nut 61 threaded to sliding mandrel 56, secures the lower ends of wire ribs 55. The ribs are preformed to bow radially outwardly such that when assembled on mandrels 51 and 56 without application of force other than that provided by the spring of the wire ribs, they would extend sufficiently to resiliently engage (or extend close to) the wall of a well pipe in which they are to be used at a point intermediate their lengths, such as at 63 in FIG. 3. A skirt 54 of impermeable, nonstretch material, preferably nylon-reinforced rubber fabric, is gripped at its upper end to mandrel 51 by wedge member 58 and extends within the interior of the wire ribs to below loops 62 where it terminates in an edge portion 64 on the exterior of the ribs at 63. The skirt is assembled on wire ribs 55, prior to securing the wire ribs to the mandrel, by passing the lower ends of each wire rib through perforations 65 in the skirt and then sliding the skirt along each wire rib until it is arranged as shown in FIGS. 3, 9 and 14.

A stop ring 66 is secured to rod 53 above sliding mandrel 56. Rod 53 extends through a protective cover sleeve 70 and at its lower end is connected to a clevis rod 71 having a larger diameter than rod 53 to provide a stop shoulder 72. A latch pin 73 extends through clevis rod 71. A cylindrical sleeve 74 is attached to rod 53 by means of pin 75 and forms an inner stop shoulder 76 for the lower end of a compression spring 77 surrounding rod 53 and an upper stop shoulder 78 for the upper end of a compression spring 79 also surrounding rod 53. The underside 80 of slidable mandrel 56 provides a stop for the upper end of spring 77.

The lower end of cover sleeve 70 is threadedly connected to a cylindrical sleeve coupling member 81 within which is arranged a cylindrical bushing 82. A shoulder 83 formed on sleeve 81 supports the lower end of spring 79. Cover sleeve 70 is provided with openings 84 spaced along its length.

Latch section E includes a cylindrical housing 85 threadedly connected to sleeve coupling 81 and terminating in a nose plug 86. A guide collar 87 arranged in housing 85 is provided with an opening 88 through which clevis rod 71 extends. A trigger mechanism generally designated 89 is pivotally mounted on a pin member 90 secured to housing 85 below collar 87. Trigger mechanism 89 includes a base member 91 pivotal on pin member 90, a latch 92 mounted on member 91, a latch release dog 93 and a spring 94 arranged in member 91 (see FIG. 12).

The apparatus illustrated in FIG. 7 is the same as that illustrated in FIG. 2, except intermediate section C has been turned upside down; i.e., reversed with nut 25 remaining on the upper end and nut 38 remaining on the lower end of section C. Nut 25 is retained on the upper end of section C in order to keep the guide elements for shaft 22 near the stylus end thereof.

The apparatus of FIGS. 8 to 11 is substantially the same as that of FIGS. 1 to 4, except the entire tool has been turned upside down and a slightly different trigger mechanism 89a has been substituted for trigger mechanism 89. Head 11 is connected to the end of housing 85 to which the nose plug 86 had been attached (FIG. 4) and nose plug 86 is connected to the end of cylindrical case 13 to which head 11 had been attached (FIG. 1).

In operation when it is desired to measure fluid flowing upwardly in casing pipe 9 (see FIG. 3), the arrangement of the apparatus as illustrated in FIGS. 1 to 4 is used. Flow diverter 54 is collapsed and placed within cover sleeve 70, as shown in FIG. 14. Sleeve 70 is held in place over the flow diverter until pin 73 is latched to latch 92, as illustrated in FIGS. 12 and 13. In this position, clevis rod 71 and pin 73 extend through opening 88 in collar 87 and springs 77 and 79 are compressed.

The flowmeter then is lowered on wireline 11 through tubing 8 with the trigger mechanism 89 in the position shown in FIG. 13 with dog 93 biased upwardly by spring 94. When latch section E passes out the lower end of tubing 8, trigger mechanism 89 assumes the position shown in FIG. 12 with dog 93 extended outwardly against the wall of casing 9. When the desired elevation in casing 9 at which flow measurements are to be made is reached, the flowmeter is pulled upwardly. This movement causes the pointed end of dog 93 to bite into the interior wall of casing 9 or engage a casing collar thereof which in turn causes member 91 to turn on pin member 90 and release latch 92 from pin 73. Spring 94 is compressed as dog 93 rotates and drops to its position shown in FIG. 4. Spring 79 acting against shoulder 83 of plate member 81 moves cover sleeve 70 and latch section E downwardly until sleeve 82 engages shoulder 72 of clevis rod 71, as illustrated in FIG. 4. At the same time, spring 77 urges sliding mandrel 56 upwardly against stop ring 66 and flow diverter 54 is positioned pressed against the wall of casing 9 to effect a seal, as shown in FIG. 3. Thus, the flow diverter is spring-loaded to force the skirt against the well pipe wall with a larger force than is possible from the spring expansion of the wire ribs. Wire loops 62 prevent the skirt from sliding up the wire ribs to thereby prevent the upwardly flowing fluid from bypassing or "blowing-by" the flow diverter. Wire ribs 55 reinforce skirt 54 and prevent "ballooning" thereof. Thus, the skirt is reinforced and held in proper shape by the looped wire ribs.

Fluid flowing upwardly in casing 9, as illustrated in FIG. 3, is diverted by impermeable skirt 54 through ports 52 and into fixed mandrel 51 and flow barrel 31. The flow of fluid through flow barrel 31 causes rotometer float 40 to move upwardly, which in turn causes shaft 22 to move upwardly through nut 38, plate stop 36 and nut 25. In turn, chart stylus 21 is moved upwardly and records the rates of upward fluid flow on chart 20 of chart drum 19, which is rotated by chart drive motor 16, powered by batteries 15. Rotation of the recorder chart 20 creates a frictional drag on chart stylus 21, which tends to rotate the rotometer shaft 22. The square-shaped rotometer shaft 22 is prevented from rotating by engagement of the edges 28 of shaft 22 with the grooves 27 in guide nut 25.

When it is desired to measure higher rates of fluid flowing upwardly in the well, the tool shown in FIGS. 1 to 4 is rearranged by turning section C of FIG. 2 upside down, replacing nuts 25 and 38 and affixing a stop ring 95 to rotometer shaft 22, as illustrated in FIG. 7. Stop ring 95 rests on nut 25 in the no-flow position of float 40 and prevents shaft 22 and float 40 from moving downwardly from this position. Fluid flowing upwardly through flow barrel 31 moves rotometer float 40 upwardly which causes shaft 22 to move upwardly. The fluid passes through ports 42 into casing 9. Sleeve 33 presses against stop plate 36 which is moved upwardly against the bias of spring 35. Thus, the flow measuring range of the flowmeter in the upward direction is increased.

To measure downward flow in casing 9, the apparatus shown in FIGS. 1 to 4 is rearranged, as illustrated in FIGS. 8 to 11. Clevis pin 73 is initially latched to trigger 92 of unit 89a. In this position, cover sleeve 70 protects flow diverter 54 and ribs 55 while the flowmeter is lowered through tubing 8. The trigger mechanism when latched to clevis rod 71 in this arrangement of the apparatus maintains sleeve 70 in a down position instead of in the up position illustrated in FIGS. 12 and 13. Once released the trigger mechanism 89a assumes the position shown in FIG. 8. Fluids flowing downwardly in casing 9, such as fluid injected through tubing 8, flows through flow diverter 54, as illustrated by the arrows in FIG. 9, into flow barrel 31 and out ports 42. Rotometer float 40 is moved downwardly by the flow of fluids past it, which in turn moves rotometer shaft 22 downwardly to cause stylus 21 to move downwardly in response to fluid flow as chart drum 19 is rotated by the drive motor 16 driven by batteries 15. Spring 35 restrains downward movement of the rotometer shaft 22. Sleeve 33 presses against plate member 36 which is moved downwardly against the bias of spring 35. The arrangement of the apparatus in FIGS. 8 to 11 permits upward movement of shaft 22 until stop sleeve 33 engages the underside of bushing 25A.

The flow diverter is easily altered for use in even larger casings by substituting longer wire ribs for those illustrated herein. When such a substitution is required, bushing 82 is removed and stop ring 66 and sleeve 74 are lowered to new positions on rod 53. In this arrangement when sleeve 70 is released from its latched position, it moves downwardly (FIGS. 3 and 4) until the upper end of sleeve 81 engages shoulder 72 on clevis rod 71. Other arrangements of the apparatus within the scope of the invention will be apparent to those skilled in the art.

Having fully described the objects, advantages, apparatus and operation of our invention, we claim:

1. A collapsible-expansible flow diverter adapted to divert fluid flow through flow measuring apparatus positioned in a well pipe comprising:
   a rod member;
   a plurality of collapsible-expansible, resilient spring wire ribs uniformly and circularly spaced about and extending axially of said rod member;
   stationary means arranged on said rod member;
   means slidably arranged on said rod member;
   each wire rib being connected at one end thereof to said stationary means and at the other end thereof to said slidable means;
   an impermeable skirt means sealingly connected at one end thereof to said stationary means and extending within said ribs along a portion of the length thereof and then extending exterior thereof;
   said wire ribs being preformed to bow radially outwardly and said skirt means being arranged in such a manner that said skirt means exterior of said wire ribs would be caused to sealingly engage the wall of said well pipe when said flow diverter is arranged in said well pipe;
   means provided on each wire rib adapted to prevent said skirt means from moving along said ribs in the direction of said stationary means;
   stop means arranged on said rod member adapted to limit movement of said slidable means in the direction of said stationary means; and
   means adapted to bias said slidable means against said stop means.

2. Apparatus as recited in claim 1 in which said means to prevent movement of said skirt along said ribs comprises a loop formed in each wire rib.

3. Apparatus as recited in claim 2 including releasable latch means connected to said rod member adapted to maintain said wire ribs in their collapsed position.

4. Apparatus as recited in claim 3 including means adapted to release said latch means to permit said wire ribs to expand.

5. Apparatus as recited in claim 4 including sleeve means connected to said latch means adapted to surround said wire ribs and skirt means in the collapsed position of said wire ribs and to be removed from surrounding said wire ribs and skirt means when said latch means releases and said wire ribs expand.

6. Apparatus as recited in claim 5 in which, when said flow measuring apparatus and said flow diverter are arranged in a well pipe, said flow measuring apparatus being connected to said fixed mandrel above said ports therein.

7. Apparatus as recited in claim 5 in which, when said flow measuring apparatus and said flow diverter are arranged in a well pipe, said flow measuring apparatus being connected to said fixed mandrel below said ports therein.

8. Apparatus as recited in claim 5 in which said stationary means comprises a fixed mandrel, and said means slidably arranged on said rod member comprises a slidable mandrel, said fixed mandrel having ports arranged between the connection of said skirt means to said fixed mandrel and said skirt means exterior of said wire ribs.

References Cited

UNITED STATES PATENTS

| | | | |
|---|---|---|---|
| 2,642,141 | 6/1953 | Kolb | 73—151 X |
| 2,649,710 | 8/1953 | Dale | 73—155 |
| 2,649,712 | 8/1953 | Dale | 73—155 |
| 2,706,406 | 4/1955 | Vincent et al. | 73—155 |
| 2,929,455 | 3/1960 | Godbey | 73—155 X |
| 2,932,740 | 4/1960 | Widmyer | 73—155 X |
| 3,113,455 | 12/1963 | Sloan et al. | 73—155 |
| 3,114,422 | 12/1963 | Solum et al. | 166—202 |
| 3,163,038 | 12/1964 | Bryant | 73—155 |
| 3,176,511 | 4/1965 | Widmyer | 73—155 |
| 3,195,042 | 7/1965 | Glenn et al. | 73—155 |

FOREIGN PATENTS 540,775  10/1941  Great Britain.

HOUSTON S. BELL, JR., *Primary Examiner.*

U.S. Cl. X.R.

73—155, 166—202